United States Patent
Ruhdorfer

(10) Patent No.: US 8,397,456 B2
(45) Date of Patent: Mar. 19, 2013

(54) PANEL WITH A SOUND INSULATION LAYER AND PRODUCTION METHOD

(75) Inventor: Herbert Ruhdorfer, Wals/Salzburg (AT)

(73) Assignee: M. Kaindl, Wals/Salzburg (AT)

( * ) Notice: Subject to any disclaimer, the term of this patent is extended or adjusted under 35 U.S.C. 154(b) by 944 days.

(21) Appl. No.: 10/491,832

(22) PCT Filed: Jun. 28, 2002

(86) PCT No.: PCT/EP02/07149
§ 371 (c)(1),
(2), (4) Date: Aug. 17, 2004

(87) PCT Pub. No.: WO03/035396
PCT Pub. Date: May 1, 2003

(65) Prior Publication Data
US 2004/0255538 A1    Dec. 23, 2004

(30) Foreign Application Priority Data

Oct. 23, 2001 (DE) .................................. 101 51 614

(51) Int. Cl.
*E04C 1/40* (2006.01)
(52) U.S. Cl. .................................. 52/309.8; 156/308.2
(58) Field of Classification Search ............. 52/309.8, 52/309.13, 309.15, 177, 589.1, 591.1, 588.1, 52/390, 403.1, 592.1; 428/215, 425.3, 494, 428/502, 503, 526; 156/228, 308.2, 583.1; 472/92
See application file for complete search history.

(56) References Cited

U.S. PATENT DOCUMENTS 1,394,120 A * 10/1921 Rockwell ...................... 144/350
(Continued)

FOREIGN PATENT DOCUMENTS

| CA | 2338367 | * | 6/2001 |
| EP | 0 411 452 | | 2/1991 |

(Continued)

OTHER PUBLICATIONS

Polyvinyl chloride. In Wikipedia. Retrieved Mar. 26, 2008, from http://en.wikipedia.org/wiki/Polyvinyl_chloride.*

(Continued)

*Primary Examiner* — Christine T Cajilig
(74) *Attorney, Agent, or Firm* — Merchant & Gould P.C.

(57) ABSTRACT

The invention relates to a method for applying to a flooring panel a layer designed to reduce the footfall sound on the floor, and a panel of this kind. With the prior art, it is disadvantageous that the sound-insulation layer is glued onto the laminate panel in a subsequent manufacturing stage. Accordingly, the panel is initially manufactured by pressing with the associated gluing of layers and/or papers. The sound-insulation layer is glued in place in a subsequent operational stage. PVA-glues, thermoplastics or wood glues may be used, for example, to attach the sound-insulation layer. In the manufacture of a panel with a carrier board, decorative paper, counteracting paper and/or a wood veneer, an additional layer, preferably in the form of a sheet or a roll, is provided. The material of this roll or sheet product is designed to provide the desired sound-insulation properties as described above and/or provides these properties when a panel is being walked over. The roll or sheet product is placed in a press and pressed together with the other components at a temperature of at least 100° C.

19 Claims, 1 Drawing Sheet

U.S. PATENT DOCUMENTS

| | | | | |
|---|---|---|---|---|
| 3,106,500 | A * | 10/1963 | Turner | 156/91 |
| 3,194,722 | A * | 7/1965 | Grudus et al. | 428/203 |
| 3,622,435 | A * | 11/1971 | Cacella | 442/374 |
| 3,624,037 | A * | 11/1971 | Von Ettingshausen | 528/243 |
| 3,720,027 | A * | 3/1973 | Christensen | 52/309.8 |
| 3,769,143 | A * | 10/1973 | Kulesza | 428/151 |
| 3,826,763 | A * | 7/1974 | Lamplugh et al. | 521/163 |
| 3,902,293 | A * | 9/1975 | Witt et al. | 52/392 |
| 3,988,187 | A * | 10/1976 | Witt et al. | 156/71 |
| 4,006,048 | A * | 2/1977 | Cannady et al. | 156/90 |
| 4,095,388 | A * | 6/1978 | Breault | 52/747.11 |
| 4,796,402 | A * | 1/1989 | Pajala | 52/390 |
| 4,966,799 | A * | 10/1990 | Lucca et al. | 428/95 |
| 5,085,424 | A * | 2/1992 | Wood, Jr. | 472/92 |
| 5,089,328 | A * | 2/1992 | Doerer et al. | 428/308.4 |
| 5,114,773 | A * | 5/1992 | Bogdany | 428/95 |
| 5,411,352 | A * | 5/1995 | Eren | 404/31 |
| 5,502,931 | A * | 4/1996 | Munir | 52/144 |
| 5,540,025 | A * | 7/1996 | Takehara et al. | 52/403.1 |
| 5,549,776 | A * | 8/1996 | Juriga | 156/228 |
| 5,879,781 | A * | 3/1999 | Mehta et al. | 428/137 |
| 5,925,211 | A * | 7/1999 | Rakauskas | 156/306.9 |
| 6,250,043 | B1 | 6/2001 | Dieckmann et al. | 52/741.41 |
| 6,332,733 | B1 * | 12/2001 | Hamberger et al. | 403/329 |
| 6,818,286 | B2 * | 11/2004 | Dohring | 428/215 |
| 2002/0056245 | A1 * | 5/2002 | Thiers | 52/589.1 |
| 2002/0092252 | A1 * | 7/2002 | Kettler et al. | 52/403.1 |
| 2002/0095894 | A1 * | 7/2002 | Pervan | 52/391 |
| 2002/0100231 | A1 * | 8/2002 | Miller et al. | 52/177 |
| 2003/0024637 | A1 * | 2/2003 | Min | 156/307.3 |
| 2003/0064199 | A1 * | 4/2003 | Moebus | 428/192 |
| 2004/0255538 | A1 | 12/2004 | Ruhdorfer | |

FOREIGN PATENT DOCUMENTS

| | | | |
|---|---|---|---|
| JP | 1171841 A | | 7/1989 |
| JP | 01304265 A | * | 12/1989 |
| JP | 3-28257 | | 2/1991 |
| JP | 05-124139 | | 5/1993 |
| JP | 05124139 | | 5/1993 |
| JP | 7-12206 | | 1/1995 |
| JP | 10-299234 | | 10/1998 |
| JP | 11-172905 | | 6/1999 |
| JP | 2005-506476 | | 3/2005 |

OTHER PUBLICATIONS

Specific gravity. In Wikipedia. Retrieved Mar. 6, 2008, from http://en.wikipedia.org/wiki/Specific_gravity.*

* cited by examiner

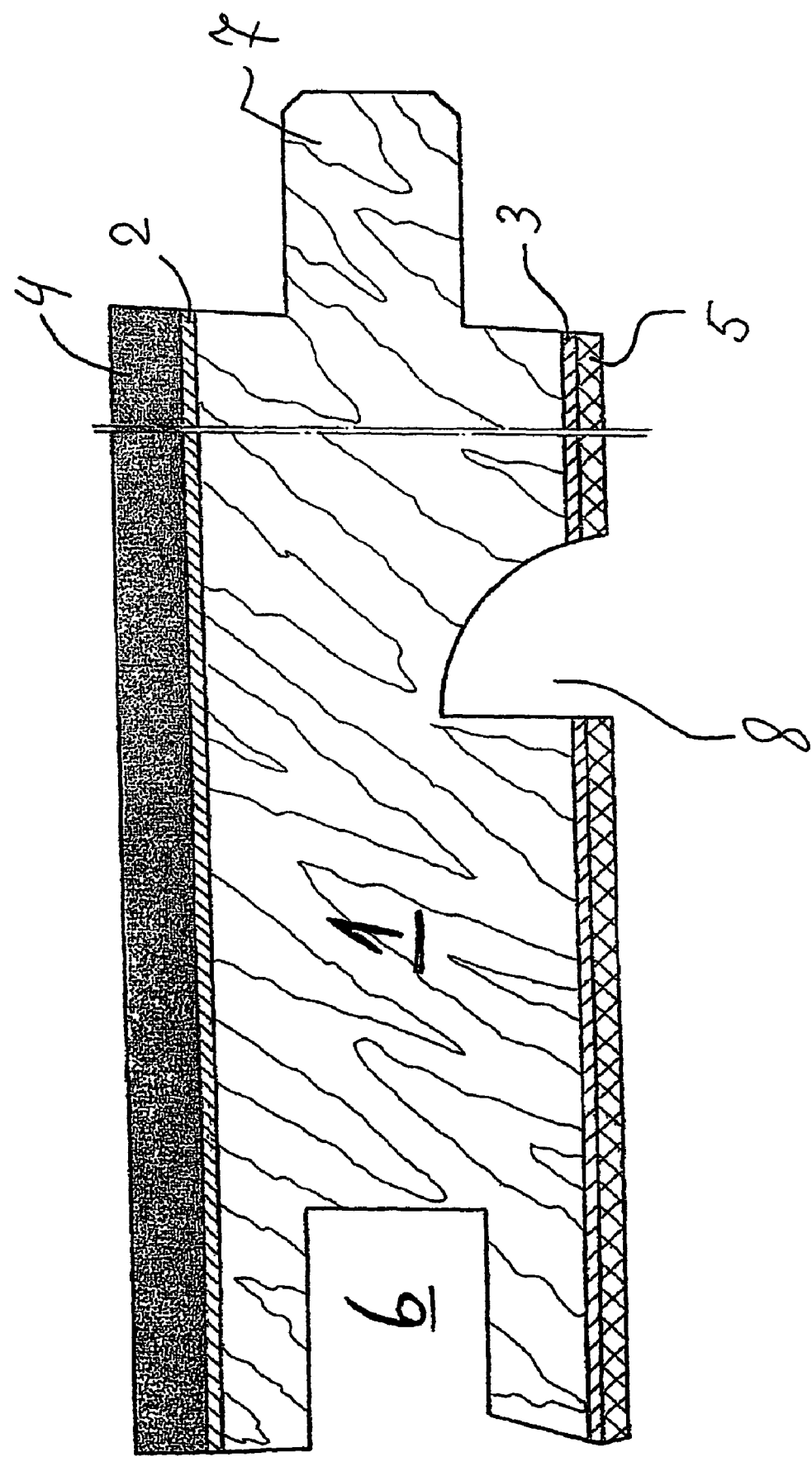

PANEL WITH A SOUND INSULATION LAYER AND PRODUCTION METHOD

The invention relates to a method for applying to a flooring panel a layer designed to reduce the footfall sound on the floor, and a panel of this kind.

In the context of flooring, panels in the form of laminated flooring or parquet flooring are already known. A laminated flooring panel consists of a so-called carrier board, which is generally manufactured from HDF, MDF or chipboard. A so-called decorative paper and another layer, which ensures adequate resistance to abrasion on the upper surface, are generally disposed above the carrier board. The decorative paper may, however, already be designed to be abrasion-resistant. A so-called counteracting paper is disposed beneath the carrier board.

In particular, the papers are impregnated with aminoplastics, especially with urea resins and/or melamine resins. Such resins will soften and harden again, if the papers are pressed with the carrier board in a press under the influence of temperature and pressure.

The decorative paper ensures the desired visual appearance of the flooring formed from the panels. The counteracting paper is provided to ensure that the carrier board and/or the panel are not distorted during the pressing of the layers and/or papers.

Parquet panels differ from laminate, in particular, with reference to their surface. The desired visual effect is achieved with wood instead of with a printed paper. A parquet floor is made of solid wood, but may also provide a carrier board made from HDF, MDF or chipboard. In this case, a wooden veneer or paper is then applied to the upper surface. A special wood or paper layer is applied to the underside as a counteracting layer.

If the panels are laid on an under-floor, a relatively loud footfall sound occurs when the floor is walked over. To prevent the development of such sound, the prior art provides a so-called footfall-sound-insulation. This is a layer with sound-damping and/or sound-absorbing properties applied beneath a panel. Additionally, or as an alternative, the layer may bring about a shift in the frequency and amplitude of the sound produced, which is then subjectively perceived as less disturbing.

The layer providing footfall insulation will be referred to in general below as the "sound-insulation layer".

Sound-insulation layers are designed, in particular, as follows:

The sound-insulation layer is generally resiliently deformable by contrast with the panel defined above. A layer of this kind may consist, for example, of recycled polyurethane material, rubber, cork, foam, thermoplastic materials, fibre matting or LDF (low density material). The density is generally around 200 to 1000 kg/m$^3$. Alternatively, a so-called heavy foil can be used as a sound-insulation layer. This is characterised by a weight of 1000 to 5000 g/m$^2$.

A heavy foil glued to the laminate ensures good contact with the under-floor, which improves application to the surface disposed beneath thereby enhancing the perception of sound when walking on the floor. A typical heavy foil consists of polyethylene with fillers.

With the prior art, it is disadvantageous that the sound-insulation layer is glued onto the laminate panel in a subsequent manufacturing stage. Accordingly, the panel is initially manufactured by pressing with the associated gluing of layers and/or papers. The sound-insulation layer is glued in place in a subsequent operational stage. PVA-glues, thermoplastics or wood glues may be used, for example, to attach the sound-insulation layer.

Retrospective gluing and the associated additional operational stage not only makes the manufacturing process more expensive, but the edge seal is also relatively poor. If a sound-insulation layer is attached in a separate operational stage, it is hardly possible to achieve a successful flush edge seal. In general, therefore, there is a region, beneath the panel, which is without a sound-insulation layer, because a flush seal is difficult to achieve in practice and is unlikely to be of good quality. Accordingly, the desired effect of the sound-insulation layer is impaired. Since this region is generally adjacent to the tongues and grooves of the panel, the mechanical stresses on these locking elements are particularly large when the floor is walked over. Moreover, there is a risk, that the sound-insulation layer can become detached from the panel during subsequent processing stages or during floor laying.

Furthermore, a thermoplastic glue provides the disadvantage that it does not bond the sound-insulation layer particularly firmly to the panel, and the sound-insulation layer can easily become detached from the panel. This leads to in handling problems and disadvantages in production, for example, when the connecting elements are cut to size.

If the sound-insulation layers are easily detached from the panel, this creates problems whenever the panels need to be shifted during laying, because the sound-insulation layer could become detached from the panel during laying. Providing a method and an associated panel, wherein the sound-insulation layer is connected to the panel in an improved manner, wherein the edge seals are improved and wherein production costs are more favourable, is a desirable objective.

The adhesive materials used may be associated with environmental problems. For example, the adhesives may contain solvents, which pollute the environment. This leads to problems relating to the disposal of the adhesives. Moreover, the adhesive is an additional component required in the production process. Avoiding the use of an additional adhesive for attaching a sound-insulation layer to a panel is therefore also desirable.

The object of the invention is to provide a cost-favourable method together with an associated panel, which, by comparison with the prior art, provides improved properties in a footfall and room sound-insulation layer.

The object of the invention is achieved by a method with the features of claim 1 and by a panel with the features of the subsidiary claim. Advantageous embodiments are specified in the dependent claims.

According to the invention, in the manufacture of a panel with a carrier board, decorative paper, counteracting paper and/or a wood veneer, an additional layer, preferably in the form of a sheet or a roll, is provided. The material of this roll or sheet product is designed to provide the desired sound-insulation properties as described above and/or provides these properties when a panel is being walked over. The roll or sheet product is placed in a press and pressed together with the other components at a temperature of at least 100° C. Higher temperatures are preferably provided during pressing, in particular, temperatures above 120° C. The temperatures are typically above 200° C., but preferably 230° C. to 250° C., in order to achieve short pressing times. Short pressing times allow the panels to be manufactured more rapidly, ensuring that the method is cost favourable.

The sheet or roll product must be suitably temperature resistant. If pressing takes place at 200° C., the material, from which the sound-insulation layer is made, must be able to withstand the selected temperature.

Selecting the appropriate materials in dependence upon a corresponding pressing temperature, in order to achieve a cost-favourable manufacturing process, can be left to a person skilled in the art.

In the manufacture of a laminate panel, the counteracting paper is impregnated with an aminoplastic. During pressing, the aminoplastic material bonds the sound-insulation layer to the panel.

The bond between the sound-insulation layer and the panel is considerably more stable by comparison with the prior art.

The manufacturing process is also more cost favourable, because one operational stage has been omitted. Additional adhesives are not required, which also leads to cost advantages. Furthermore, the method is environmentally friendly, because adhesives, which must be additionally disposed of, are not required. Solvents present in the adhesives are also avoided.

According to experience, after the manufacture of a large-format panel, the panels are sawn into panels of, for example, 1.40 m×0.20 m, and the locking elements, such as tongues and grooves are milled into the panels. A flush edge seal is achieved between the panel and the sound-insulation layer, and accordingly, in this context, the disadvantages named above are avoided.

Since the bond between the sound-insulation layer and the panel is very strong, the milling stage can be carried out without difficulty. With the prior art, this process presented difficulties, because the bond between the panel and the footfall sound-insulation layer was relatively unstable.

If the sound-insulation layer is to be connected to a parquet panel, a short-cycle press is used for this process. To provide the aminoplastic, a paper can be placed between the lowest layer of the panel and the sound-insulation layer. In this case, the paper may be impregnated or otherwise provided with the aminoplastic.

In one embodiment of the invention, a recycled polyurethane material is used, and the sound-insulation layer is formed from this material. The material is cost favourable and provides very good sound-insulation properties. It is obtained from the recycling industry and is therefore environmentally compatible.

In this context, the sound-insulation layer should be at least 0.5 mm thick in order to achieve good sound-insulation properties, which are acceptable to the consumer. In practice, the layer made from recycled polyurethane material can be up to 5 mm thick. If the sound-insulation layer is very thick, noticeable disadvantages occur with reference to thermal conductivity. Good thermal conductivity is relevant if under-floor heating is to be installed or used. An excessively thick laminate floor is also undesirable, because of the associated large structural height after laying. This is disadvantageous to the consumer, for example, because doors may have to be adapted, as occurs routinely, particularly in the context of refurbishment.

Melamine resin and/or urea resin and/or mixtures thereof are preferred as the aminoplastics. These are resins, which are typically used in decorative papers and counteracting papers. If these resins are used, no additional material components need to be provided for the manufacture of the product.

The pressure applied in the press is typically between 5 and 70 kPa. The sound-insulation layer is generally compressed during this process. When using polyurethane (PUR), the layer is typically compressed, for example, from 1.2 mm to 0.5 mm. However, because of the conservation of mass, the sound-insulation properties are not significantly changed.

Recycled polyurethane material, for example, with a density between 110 $kg/m^3$ and 750 $kg/m^3$ may be used as a starting material.

The product manufactured according to the invention differs from the prior art particularly in that the bond between a panel and the sound-insulation layer is achieved with an aminoplastic. In particular, the bond is achieved on the basis of aminoplastics, which are also used in the manufacture of a panel. This is advantageous because it avoids the use of additional materials.

In a further embodiment of the invention, as an alternative to recycled polyurethane material, a material, from which a heavy foil is manufactured, may be used. Polyethylene with fillers is preferred in this context.

Experiments have shown that the named materials, recycled polyurethane material and polyethylene with the fillers, achieve particularly good sound-insulation properties. Moreover, these materials can be processed without difficulty and attached to a laminate or parquet flooring panel.

In manufacturing, products on a roll are used by preference, so that the panels can be pressed using double-band press. Otherwise a short-cycle press would have to be used, which would significantly increase manufacturing costs, because short pressing times cannot be realised.

With the method according to the invention, a panel is manufactured, in which a layer is bonded beneath the panel using an aminoplastic. Because sawing and milling are carried out at a subsequent stage, the product is essentially characterised by its very good edge seal. Accordingly, no gap is left between the underside of the panel and the sound-insulation layer. This means that the flush edge seal is an additional essential feature of the product manufactured according to the method.

The sound-insulation layer terminates flush with the panel, in particular, at the position where sawing or milling has been carried out. For example, the flush seal can also be provided with a groove, which has been milled into the underside of the panel, for example, for use in a non-glued connection between panels.

A visible offset between the sound-insulation layer and the flooring panel does not therefore occur, unless it is created in another, subsequent operational stage.

The selected materials, recycled polyurethane material and polyethylene with fillers, are heat-resistant, so that they can be pressed under the influence of heat. They are also particularly suitable for this reason.

In the case of a laminate, the thickness of a panel is typically 5 to 14 mm. With parquet flooring panels, the thickness is typically approximately 10 to 20 mm. The sound-insulation layer on the underside, which may be very thin, is added to this.

The sound-insulation layer is preferably thinner than the panel, in particular, thinner than the carrier board.

The invention will now be described in greater detail with reference to the exemplary embodiment shown in the drawing.

The drawing shows a cross-section of a laminate panel, which has been manufactured from a carrier board 1, a decorative paper 2, a counteracting paper 3 and an abrasion-resistant layer 4. The carrier board consists of MDF/HDF (but other materials are possible). This material is made from wood fibres, which are first provided with glue and then pressed in a press to form a board. The decorative paper 2 is first attached to the carrier board 1, and the abrasion-resistant layer 4 is attached above this. The counteracting paper 3 is attached beneath the carrier board 1. The paper layers and the abrasion-resistant layer are initially provided with a mixture of a melamine resin and/or urea resin. Under the influence of heat and pressure, the resins are softened. A strong bond between the various layers is achieved through the subsequent hardening.

By way of difference from the prior art, according to the present invention, a sound-insulation layer 5 was additionally pressed together with the other layers named above. The sound-insulation layer, in this case, consists of polyurethane (PUR). The initial layer thickness was 1.2 mm. As a result of compression of the various layers, this thickness is reduced to 0.5 mm. The sound-insulation layer 5 is bonded to the counteracting paper 3 by means of the resins used.

After manufacturing the layered composite material, a groove 6 and a tongue 7 were milled into the sides of the panel. A groove 8 is provided in the underside of the panel (if required).

As a result of the manufacturing method, the transition from the sound-insulation layer 5 to the panel is flush. This applies to the lateral limits of the panel and also to the transitions which occur relative to the groove 8.

Metal plates, which connect two panels 1 together in the horizontal direction, can be inserted into the groove 8 of one panel and the corresponding groove 8 of another panel during floor laying. Accordingly, a groove 8 is allocated to each tongue and each groove. For reasons of clarity, only one groove 8 has been shown in the drawing. If the panel had been drawn in its entirety, another groove 8, allocated to the tongue 7, would be visible in mirror-image reversal.

The invention claimed is:

1. A floor panel with an attached sound-insulation layer, comprising:
    a plurality of layers pressed in a press under the influence of pressure and heat, the layers comprising:
    a carrier board;
    a paper layer impregnated with an aminoplastic;
    a sound-insulation layer comprising a resiliently deformable recycled polyurethane material compressed during pressing and attached to the underside of said carrier board solely by a bond with the aminoplastic of the paper layer impregnated with the aminoplastic; and
    said panel with the attached sound-insulation layer having milled sides forming:
    a flush transition from the carrier board and paper layer to the sound-insulation layer; and
    locking elements comprising lateral tongues and grooves.

2. Panel according to claim 1, wherein said sound-insulation layer is thinner than the carrier board.

3. Panel according to claim 1, wherein said carrier board comprises HDF, MDF, chipboard or wood, and a decorative paper or a wood veneer is applied above said carrier board.

4. Panel according to claim 1, wherein a melamine resin and/or a urea resin is used as the aminoplastic.

5. Panel according to claim 1, wherein at least one layer is provided comprising wood, to form an upper layer in the plurality of layers forming said panel.

6. Panel according to claim 1, wherein said sound-insulation layer comprises a material, which is temperature-resistant above 200° C.

7. Panel according to claim 1, wherein said sound-insulation layer terminates flush with said panel at the sides of said panel.

8. Panel according to claim 1, wherein said panel is 5 to 20 mm thick, and said sound-insulation layer is up to 5 mm thick.

9. Panel according to claim 1, wherein at least one groove is milled through the compressed sound-insulation layer and into said carrier board from below, and said sound-insulation layer is flush with both sides of the groove.

10. Method for manufacturing a sound-insulating floor panel, comprising:
    pressing a plurality of layers together in a press under the influence of pressure and heat to form bonds between the layers, the layers comprising a carrier board, a sound-insulation layer and a paper impregnated with an aminoplastic disposed between the carrier board and the sound-insulation layer, wherein the sound-insulation layer comprises resiliently deformable recycled polyurethane material, rubber, cork, foam, thermoplastic materials, fiber matting, LDF or polyethylene is compressed to have a final thickness less than half an original thickness;
    allowing the aminoplastic to harden and form a floor panel, the hardened aminoplastic forming the bond between the sound-insulation layer and the carrier board; and
    after pressing and hardening of the aminoplastic, milling the plurality of layers bonded together to form sides of the floor panel having the carrier board and impregnated paper flush with the sound-insulation layer and to form complementary tongues and grooves.

11. Method for manufacturing a floor panel according to claim 10, wherein the sound-insulation layer is thinner than the carrier board.

12. Method for manufacturing a floor panel according to claim 10, wherein the carrier board comprises HDF, MDF, chipboard or wood.

13. Method for manufacturing a floor panel according to claim 10, wherein said aminoplastic comprises a melamine resin and/or a urea resin.

14. Method for manufacturing a floor panel according to claim 10, wherein at least one wood layer forms an upper layer of the plurality of layers to be pressed.

15. Method for manufacturing a floor panel according to claim 10, wherein said sound-insulation layer comprises a material, which is temperature-resistant above 200° C.

16. Method for manufacturing a floor panel according to claim 10, wherein said panel with the attached sound-insulation layer is sawn after pressing, being compressed and hardened.

17. Method for manufacturing a floor panel according to claim 10, further comprising milling a groove from below up through the compressed and hardened sound-insulation layer and into the carrier board.

18. Method for manufacturing a floor panel according to claim 10, wherein the sound-insulation layer is flush with an upper edge of the panel.

19. Panel according to claim 1, wherein said sound-insulation layer terminates flush with said panel at the sides of said panel above and below the tongues and grooves.

* * * * *